United States Patent
Sungkhaphong et al.

(10) Patent No.: US 8,789,446 B1
(45) Date of Patent: Jul. 29, 2014

(54) SCREW FEEDING APPARATUS TO DELIVER A SCREW FROM A VIBRATING RAIL TO A SCREW GUIDE TUBE

(75) Inventors: Komgrit Sungkhaphong, Bangkok (TH); Tirasak Nakpoom, Pathumthani (TH); Yuranan Rattanaphanna, Bangkok (TH); Seksan Foythong, Srisaket (TH)

(73) Assignee: Western Digital Technologies, Inc., Irvine, CA (US)

( * ) Notice: Subject to any disclaimer, the term of this patent is extended or adjusted under 35 U.S.C. 154(b) by 375 days.

(21) Appl. No.: 13/171,150

(22) Filed: Jun. 28, 2011

(51) Int. Cl.
*B25B 23/04* (2006.01)
*B65H 5/08* (2006.01)

(52) U.S. Cl.
USPC .................. 81/57.37; 221/236; 81/432

(58) Field of Classification Search
USPC ......... 81/57.37, 430, 432, 435; 221/156, 163, 221/165, 171, 173, 224, 236, 268, 298; 227/107, 112, 119; 414/751.1, 751.2, 414/800
See application file for complete search history.

(56) References Cited

U.S. PATENT DOCUMENTS

| | | | |
|---|---|---|---|
| 2,273,268 A | 2/1942 | Hunter et al. | |
| 2,314,760 A | 3/1943 | Blair | |
| 2,657,721 A | 11/1953 | Shaff | |
| 3,275,047 A | 9/1966 | Kulman | |
| 3,297,199 A * | 1/1967 | Law | 221/224 |
| 3,583,451 A | 6/1971 | Dixon et al. | |
| 3,680,194 A | 8/1972 | Monaghan et al. | |
| 4,495,841 A | 1/1985 | Mori et al. | |
| 4,627,316 A | 12/1986 | Mori et al. | |
| 4,669,359 A | 6/1987 | Shiba | |
| 4,790,234 A | 12/1988 | Hampejs et al. | |
| 4,800,325 A | 1/1989 | Nakanishi | |
| 4,813,312 A | 3/1989 | Wilhelm | |
| 4,815,343 A * | 3/1989 | Sofinowski | 81/57.37 |
| 4,881,435 A | 11/1989 | Hansson | |
| 4,905,842 A | 3/1990 | Habele et al. | |
| 4,908,926 A | 3/1990 | Takeshima et al. | |
| 4,922,436 A | 5/1990 | Dohm et al. | |
| 4,924,732 A | 5/1990 | Hoskins et al. | |
| 4,955,476 A | 9/1990 | Nakata et al. | |
| 5,010,286 A | 4/1991 | Nakamura et al. | |
| 5,014,876 A * | 5/1991 | Young et al. | 221/268 |

(Continued)

OTHER PUBLICATIONS

Microtec Systems, "Microdrive G4, Screwdriver System User's Manual", Microtech Systems GmbH, Ver.0.93, Nov. 11, 2005, pp. 1-35.

(Continued)

*Primary Examiner* — Hadi Shakeri (57) ABSTRACT

Disclosed is a screw feeding apparatus to deliver a screw from a screw feeder having a vibrating rail to a screw guide tube. The screw feeding apparatus comprises a first actuator having a pocket and a second actuator having a screw pickup. The first actuator is moveable between a detection position and a retracted position, wherein the first actuator is configured to detect a screw in the pocket received from the vibrating rail of the screw feeder in the detection position and to then move to the retracted position. The second actuator is moveable between a pickup position and a drop position, wherein the screw pickup of the second actuator is configured to pick up the screw from the pocket of the first actuator in the pickup position and to move to the drop position to drop the screw into the screw guide tube.

16 Claims, 7 Drawing Sheets

(56) References Cited

U.S. PATENT DOCUMENTS

| | | | |
|---|---|---|---|
| 5,019,763 A | 5/1991 | Komatsu | |
| 5,059,089 A | 10/1991 | Kocaoglan | |
| 5,090,103 A | 2/1992 | Nakata et al. | |
| 5,121,558 A | 6/1992 | Caroe et al. | |
| 5,154,242 A | 10/1992 | Soshin et al. | |
| 5,170,852 A | 12/1992 | Shikata et al. | |
| 5,186,084 A | 2/1993 | Totsu | |
| 5,215,270 A | 6/1993 | Udocon et al. | |
| 5,270,625 A | 12/1993 | Neff | |
| 5,289,886 A | 3/1994 | Shikata et al. | |
| 5,345,766 A | 9/1994 | Leonhartsberger et al. | |
| 5,359,269 A | 10/1994 | Wedeen et al. | |
| 5,425,473 A | 6/1995 | Kvalheim | |
| 5,480,087 A | 1/1996 | Young et al. | |
| 5,511,933 A | 4/1996 | Herklotz | |
| 5,549,169 A | 8/1996 | Matsumura et al. | |
| 5,603,442 A | 2/1997 | Schmidt et al. | |
| 5,631,823 A | 5/1997 | Layer et al. | |
| 5,631,852 A | 5/1997 | Chen | |
| 5,708,586 A | 1/1998 | Ikeda | |
| 5,758,798 A * | 6/1998 | Duffy et al. | 221/236 |
| 5,777,246 A | 7/1998 | Woods et al. | |
| 5,779,127 A | 7/1998 | Blacket et al. | |
| 5,823,356 A | 10/1998 | Goodrich et al. | |
| 5,839,332 A | 11/1998 | Fujiyama et al. | |
| 5,857,587 A | 1/1999 | Ota | |
| 6,086,292 A | 7/2000 | Yokoyama | |
| 6,247,387 B1 | 6/2001 | Ketteringham | |
| 6,418,818 B1 | 7/2002 | Tham et al. | |
| 6,497,036 B1 | 12/2002 | Jenkins et al. | |
| 6,543,119 B2 | 4/2003 | Jenkins et al. | |
| 6,575,347 B2 | 6/2003 | Coonrod et al. | |
| 6,680,595 B2 | 1/2004 | Ito | |
| 6,681,659 B2 | 1/2004 | Hoe et al. | |
| 6,701,212 B2 | 3/2004 | Shiba et al. | |
| 6,787,724 B2 | 9/2004 | Bennett et al. | |
| 6,840,929 B2 | 1/2005 | Kurata | |
| 6,945,140 B2 | 9/2005 | Gibbons et al. | |
| 6,951,298 B1 | 10/2005 | Cogley et al. | |
| 7,077,621 B2 | 7/2006 | Ruden | |
| 7,178,432 B1 | 2/2007 | Han et al. | |
| 7,400,106 B2 | 7/2008 | DeCicco et al. | |
| 7,416,086 B2 | 8/2008 | Lanni | |
| 7,422,135 B2 | 9/2008 | Kvalheim | |
| 7,458,282 B1 | 12/2008 | Wuester, Sr. et al. | |
| 7,506,553 B1 | 3/2009 | Panyavoravaj | |
| 8,083,057 B2 | 12/2011 | Kuboyama | |
| 8,230,570 B1 | 7/2012 | Choong | |
| 8,245,601 B1 | 8/2012 | Hastama et al. | |
| 2001/0035087 A1 | 11/2001 | Subotnick | |
| 2005/0039580 A1 | 2/2005 | Gibbons et al. | |
| 2005/0196264 A1 | 9/2005 | Ruden | |

OTHER PUBLICATIONS

Microtec Systems, "Components and Systems for Total Process Controlled Screw Tightening", Microtec Systems Torque Competence, 2005/2006, pp. 1-30.

* cited by examiner

SCREW FEEDING APPARATUS TO DELIVER A SCREW FROM A VIBRATING RAIL TO A SCREW GUIDE TUBE

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, server computers, laptop computers, mobile computing devices (e.g., personal digital assistants (PDAs), cell-phones, etc.), as well as any other type of computer system. A computing device typically includes a processor and a memory as well as other types of electronic devices, such as, a disk drive.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a disk clamp and a disk fastener (or screw) to mount the disk to a spindle motor that rapidly rotates the disk, and a head stack assembly ("HSA") that includes a moveable actuator arm and a head gimbal assembly ("HGA") with a moveable transducer head for reading and writing data. The HSA forms part of a servo control system that positions the moveable head over a particular track on the disk to read or write information from and to that track, respectively.

Due to the cost competitiveness of the disk drive industry, the components of a disk drive need to be assembled in a very precise and cost effective manner. In order to be cost effective, complex components of the disk drive, such as disk clamps, disks, spindle motors, HDAs, HGAs, etc., need to be assembled, with fasteners, such as screws, in a very time effective manner with a very low error rate—even though many of the components require highly precise assembly. Also, many of these types of components often need to be assembled in a very clean fashion in which debris and contamination particles are kept to a minimum. Further, as disk drives are being actively utilized more and more by users as standard hard disk drives, enterprise hard disk drives, moveable external disk drives, and/or for use in smaller computing devices such as laptops and mobile devices (e.g. PDAs, cell-phones, etc.), they are increasingly requiring smaller and smaller components for assembly.

In particular, the assembly process for hard disk drives is requiring the use of smaller and smaller screws. These smaller screws are becoming very difficult to feed with currently utilized feeding mechanisms because of the small screw height to head diameter ratio (i.e., the aspect ratio). In fact, many hard disk drives are utilizing screws with an aspect ratio close to 1.0 (i.e., a low aspect ratio), which are encountering many problems in the assembly process.

Disk drives need to be assembled with more reliability, performance, and compactness when utilizing screws with low aspect ratios. Presently, some screw feeders utilize a vibrating rail to transfer screws to a tube for delivery to a screw insertion assembly machine for mounting the screws to components of the disk drive.

Unfortunately, presently utilized screw feeders are encountering many problems with low aspect ratio screws. In particular, a common implementation in which a screw feeder utilizes a vibrating rail that directly drops screws into a screw guide tube encounters many problems because of the screws falling away, jamming, and flipping during the feeding process. Therefore, it would be beneficial to provide a screw feeding apparatus that can feed screws into a screw guide tube in a fashion that minimizes screws falling away, jamming, and flipping.

DETAILED DESCRIPTION

Figure 1:
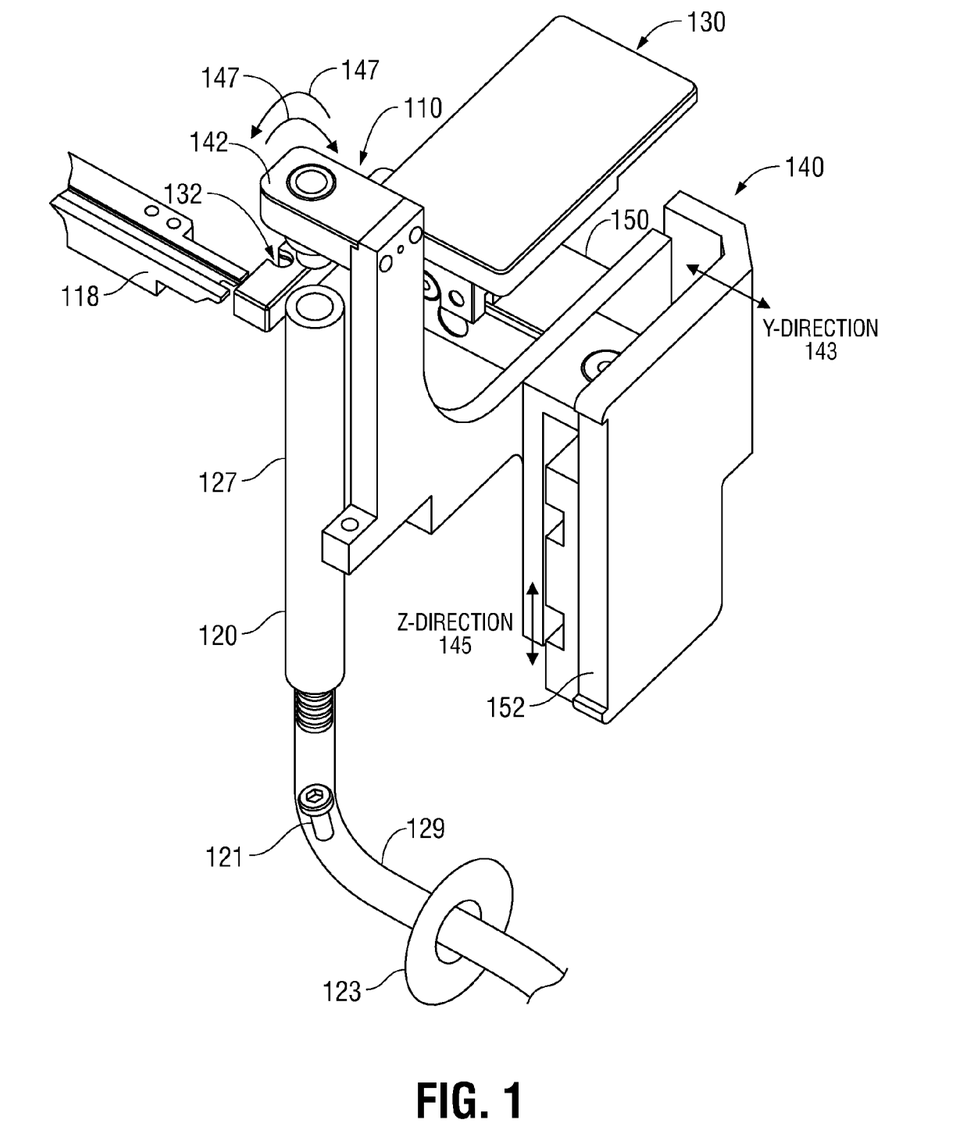
FIG. 1 is a perspective view of a screw feeding apparatus to deliver a screw from a screw feeder having a vibrating rail to a screw guide tube, according to one embodiment of the invention.
Figure 2:
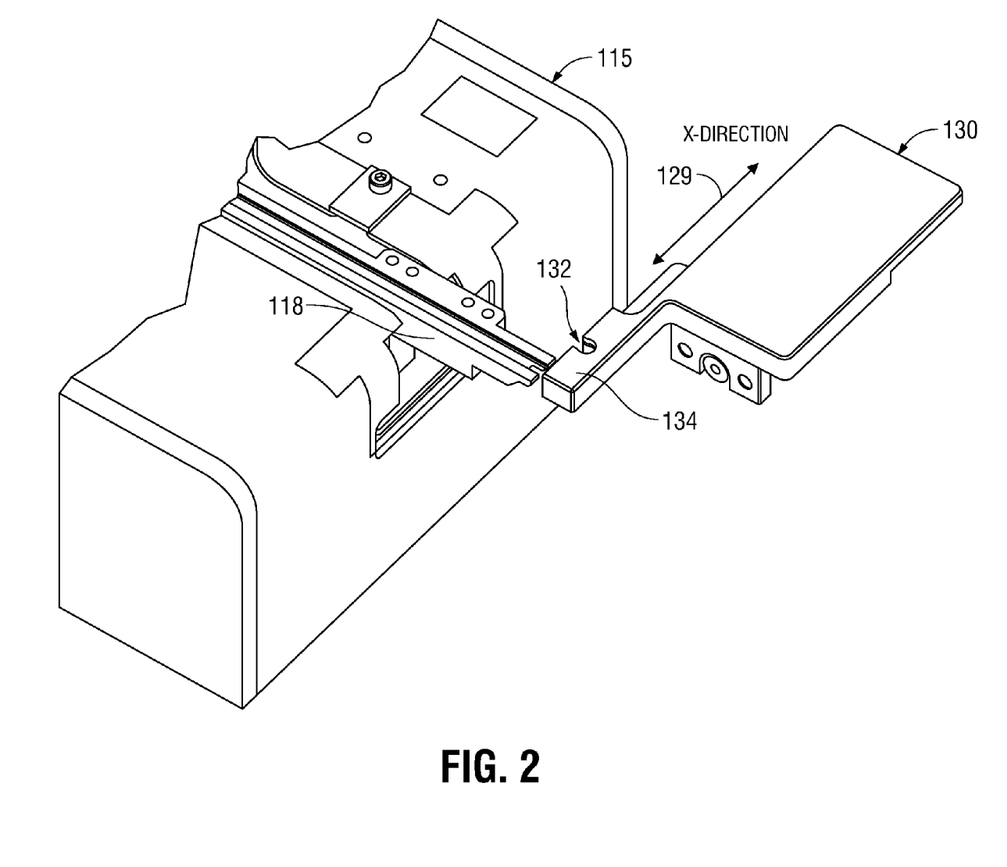
FIG. 2 is a perspective view of a portion of the screw feeding apparatus illustrating the first actuator, according to one embodiment of the invention.
Figure 3:
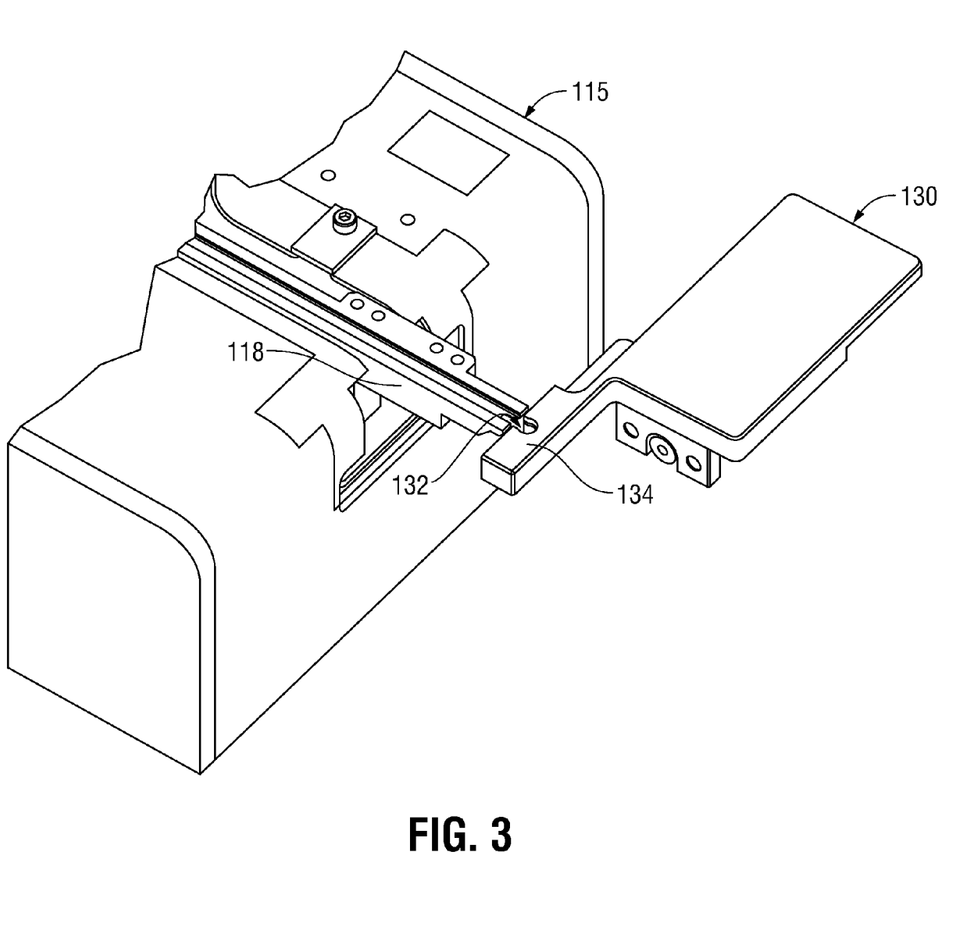
FIG. 3 is a perspective view of a portion of the screw feeding apparatus illustrating the first actuator, according to one embodiment of the invention.

With reference to FIGS. 1-3, a screw feeding apparatus 110 to deliver a screw 121 from a screw feeder 115 having a vibrating rail 118 to a screw guide tube 120, according to one embodiment of the invention, will be hereinafter described. Screw feeder 115 is a typical commercial screw feeder that includes a vibrating rail 118 to move screws down the line. However, vibrating rail 118 may be partially extended and may operate in conjunction with screw feeding apparatus 110, according to embodiments of the invention. In particular, vibrating rail 118 is extended to operate in conjunction with a first actuator 130 of the screw feeding apparatus 110, as will be described. Also, it should be noted that screw feeding apparatus 110 includes a screw guide tube 120 that may include a metal drop portion 127 and polyurethane tube portion 129 to deliver screws 121 to a screw driver assembly machine (not shown) for use in mounting the screws to components. Screw feeding apparatus may include at least a first actuator 130 and a second actuator 140, as will be hereinafter described.

In one embodiment, screw feeding apparatus 110 includes a first actuator 130 having a pocket 132. As an example, the first actuator 130 is approximately rectangular-shaped with an extending arm 134 that includes pocket 132. The first actuator 130 is movable between a detection position (FIG. 3) and a retracted position (FIG. 2) in the x-direction 129. In the detection position, as shown FIG. 3, the first actuator 130 is configured to detect a screw 121 in the pocket 132 received from the vibrating rail 118 of the screw feeder 115. In one embodiment, the pocket 132 of first actuator 130 includes a sensor to detect a screw in the pocket 132. For example, the sensor of pocket 130 may be an optical sensor.

After the sensor of the pocket 132 has detected the screw 121, the first actuator 130 is moved to the retracted position (FIG. 2) away from the rail 118 of the screw feeder 115 in the x-direction 129. Screw 121 moves out away from the rail 118 and enters into the screw pocket 132 of the first actuator 130 and is received and contained in pocket 132 of first actuator 130 (FIG. 3). First actuator 130 then retracts away from the rail 118 of the screw feeder 115 after screw 121 has been detected inside the pocket 132 by the sensor (FIG. 2). In this way, a single screw 121 rests separately away from the screw feeder 118 to be transferred out by second actuator 140, as will be hereinafter described.

As can be seen in FIG. 1, second actuator 140 includes a screw pickup 142. Second actuator 140 is moveable between a pickup position and a drop position. In order to move between the pickup position and the drop position, second actuator 140 moves in the y-direction 143 and the z-direction 145. Screw pickup 142 of the second actuator 140 may be configured to pick up a screw 121 from the pocket 132 of the first actuator 130, in the pickup position, and move to the drop position to drop the screw into the screw guide tube 120. Thus, the second actuator 140 moves up and down (z-direction 145) and back and forth (y-direction 143) as shown by lines 147 to pick up a screw 121 from the pocket 132 of the first actuator 130 and to then drop the screw 121 into the screw guide tube 120.

During assembly operations, the first actuator 130 may receive a screw from the vibrating rail 118 of the screw feeder 115 on a screw by screw basis and the second actuator 140 moves up and down and back forth to pick up the screw from the pocket 132 of the first actuator 130. The second actuator 140 drops the screw into the screw guide tube 120 for delivery to a screw insertion assembly (not shown). After dropping screw 121 into the screw guide tube 120, first actuator 130 moves back to the detection position in the x-direction 129 to detect a next screw 121 from the screw feeder 118 and second actuator 140 moves back in the y-direction 143 and the z-direction 145 to the pickup position. In one embodiment, the screw 121 is dropped into the screw guide tube 120 for receipt and use by a screw insertion assembly machine (not shown) for mounting the screw to components of a disk drive.

As one example, the first actuator 130 and the second actuator 140 are pneumatically controlled actuators. As can be seen in FIG. 1, the first actuator 130 is approximately rectangular-shaped with an extending arm 134 that includes pocket 132 and moves in the x-direction 129. The second actuator 140 is also approximately rectangular-shaped having an approximately L-shaped extension arm to which the screw pickup 142 pickup is mounted and moves in the y-direction 143 and the z-direction 145 to move up and down and back and forth to pick up screws 121 from the pocket 132 of first actuator 130 and to drop screws 121 into tube 120, respectively. Further, the second actuator 140 may include two separate pneumatically controlled actuators: a y-actuator 150 (for movement in the y-direction 143) and a z-actuator 152 (for movement in the z-direction).

In this type of embodiment, for the use of pneumatically controlled actuators 130, 140, 150, and 152, as is well known in the art, pistons, internal cylinders, air inlets, and air outlets (not shown), are used to receive air and vacuum flow (or other gases or liquids) from air and vacuum generators (not shown) to move the actuators.

However, in other embodiments, actuators 130, 140, 150, and 152 may be motor controlled actuators to move in the x-direction 129, the y-direction 143, and z-direction 145 to implement the previously-described functions. As should be appreciated by those skilled in the art pneumatically controlled actuators and motor controlled actuators are well known. Further, as should be appreciated by those skilled in the art, a wide variety of different types of actuators may be utilized instead of or in addition the pneumatically controlled actuators and motor controlled actuators.

Figure 4:
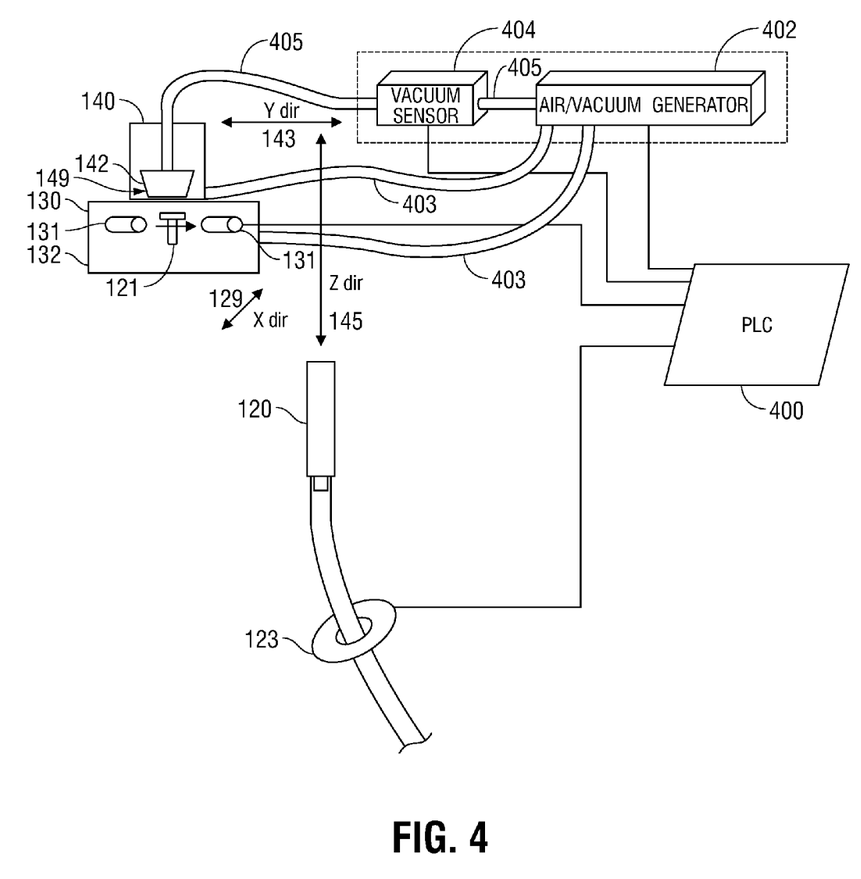
FIG. 4 is a diagram illustrating components of the screw feeding apparatus, according to one embodiment of the invention.

With additional reference to FIG. 4, in one embodiment, programmable logic controller (PLC) 400 may be coupled to air/vacuum generator 402, vacuum sensor 404, optical sensor 131 of first actuator 130, and magnetic sensor 123 of tube 120. In this pneumatic implementation, PLC 400 may control the air/vacuum generator 402 to provide air pressure and air vacuum via tubes 403 to the first actuator 130 to control movement in the x-direction 129 between the detection and retracted positions and to the second actuator 140 to control movement in the y-direction 143 and the z-direction 145 between the pickup and drop positions, as previously described.

For example, PLC 400 may determine that a screw 121 is located in the pocket 132 of the first actuator 130 in the detection position based upon data from the optical sensor 131 and may then command that the first actuator 130 be moved to the retracted position (along the x-direction 129) via air/vacuum generator 402. Further, the screw pickup 142 of the second actuator 140 includes a screw detector portion 149 to which the screw 121 is sucked into by vacuum suction via tube 405 during pickup. Vacuum sensor 404 identifies the lack of air pressure because screw 121 is located in the screw detector portion 149 and communicates this identification to the PLC 400. In this way, PLC 400 can determine that a screw 121 is located in the screw detector 142 of the second actuator 140 based upon data from the vacuum sensor 404 and can command that the second actuator 140 be moved to the drop position (along the y and z direction 143 and 145) to drop the screw 121 into the screw guide tube 120.

Additionally, as shown in FIG. 4, a magnetic sensor 123 may be mounted to the screw guide tube 120 and the magnetic sensor 123 magnetically senses a screw 121 that passes through it and transmits screw passage data to the PLC controller 400. Based upon this, the PLC controller 400: determines that the screw 121 has been dropped through the screw guide tube 120 based upon the screw passage data from the magnetic sensor 123; commands that the second actuator 140 be moved back to the pickup position; and commands that the first actuator 130 be moved back to the detection position.

It should be appreciated that the previously described embodiment of FIG. 4 utilizes an air/vacuum generator 402 to apply air pressure and vacuum to the first and second actuators 130 and 140, however, in other embodiments, motor controlled actuators or other type of actuators may be utilized.

Figure 5A:
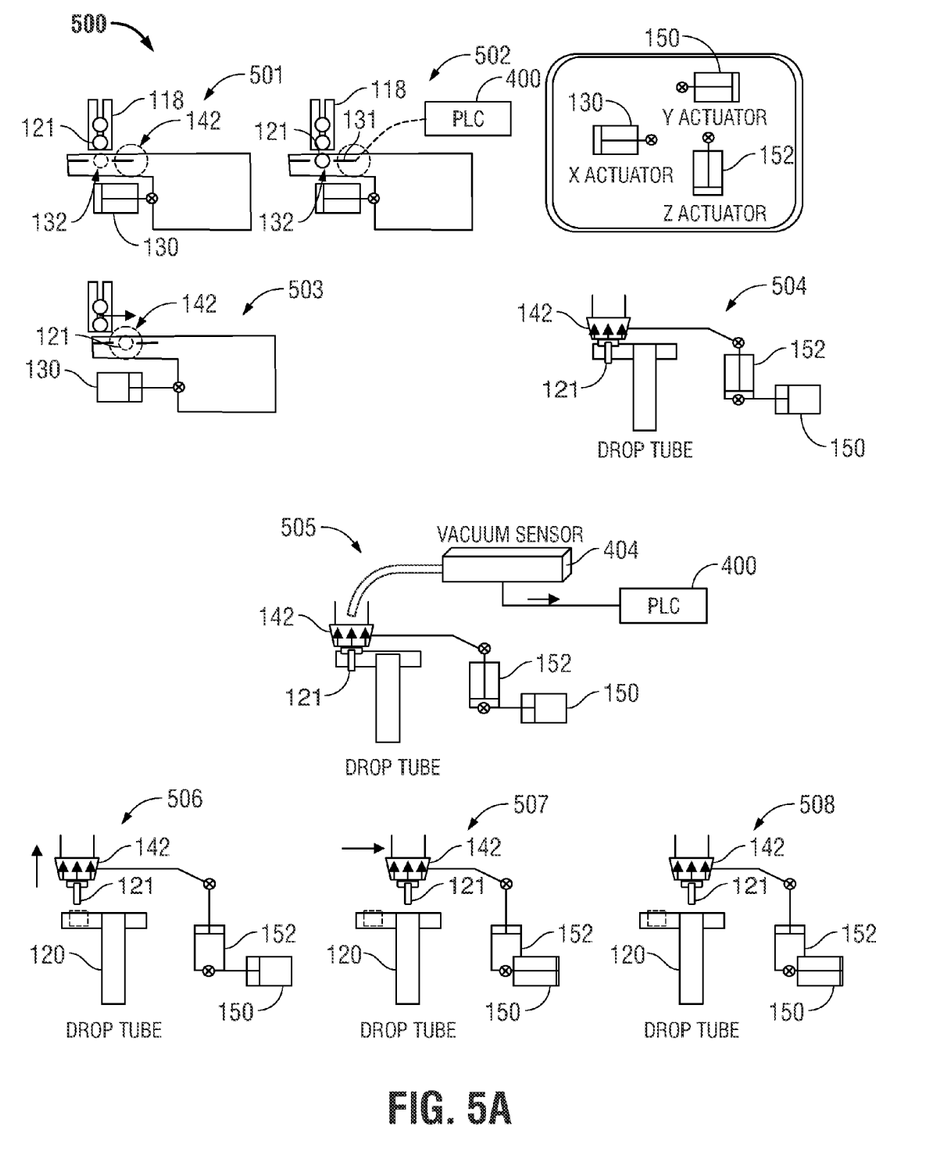
FIGS. 5A-5C show diagrams of a series of process steps to illustrate the operations of the screw feeding apparatus, according to one embodiment of the invention.
Figure 5B:
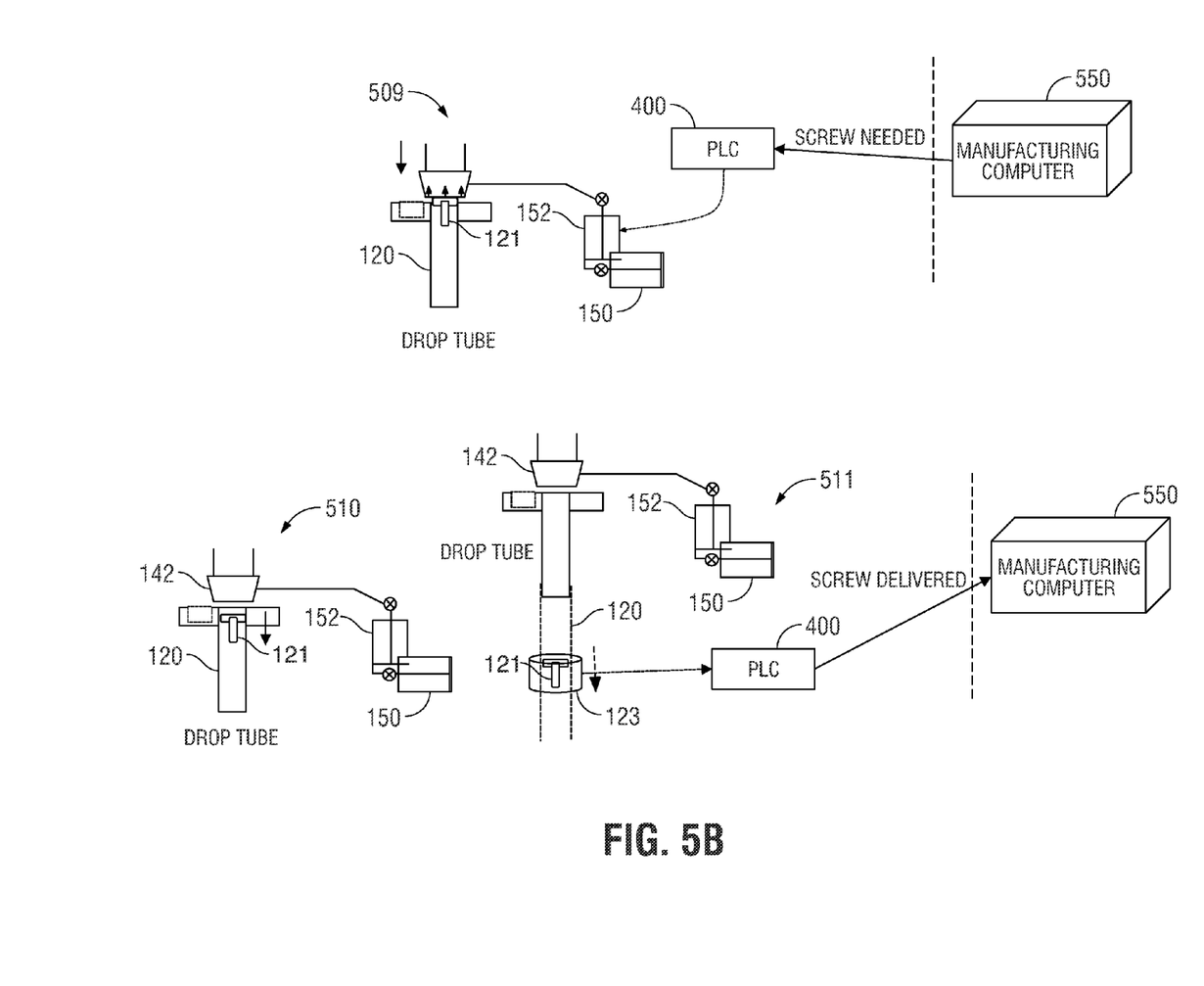
Figure 5C:
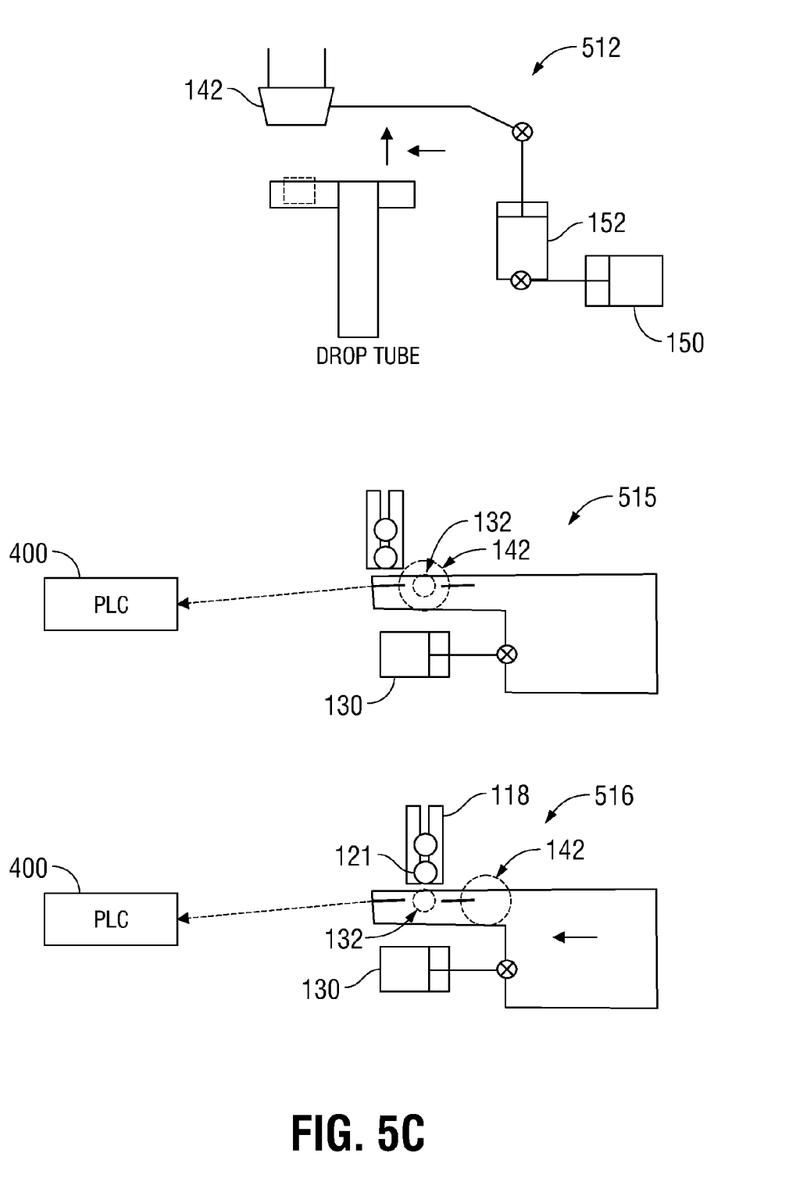

With additional reference to FIGS. 5A-5C, a series of process steps 500 to illustrate the operations of the screw feeding apparatus are illustrated. At step 1, 501, the x actuator 130 is shown in the detection position with the pocket 132 waiting for a screw 121 from the vibrating rail 118 to move into the pocket 132. As can also be seen, screw detector 142 of the second actuator is still located at the pickup position. Next, at step 2, 502, screw 121 slides from the vibrating rail 118 into pocket 132 and sensor 131 detects the screw 121 and passes the screw detection data from the sensor 131 to the PLC 400. At step 3, 503, PLC 400 commands that the rail 118 of screw feeder 115 stop vibrating. Further, PLC 400 commands that the x actuator 130 move in the x-direction to the retracted position. At this point the screw pickup 142 of the second actuator 140 (including y actuator 150 and z actuator 152) is located directly above the screw 121.

Next, at step 4, 504, PLC 400 turns on the vacuum generator creating sufficient vacuum to suck screw 121 up into the screw pickup 142 of the second actuator 152,150. It should also be noted that the PLC 400 has commanded that the z actuator 152 be moved down to the pickup position. At step 5, 505, vacuum sensor 404 senses that screw 121 is firmly picked up into the screw pickup 142 of the second actuator 152, 150 and communicates that data to the PLC 400. Because of this, at step 6, 506, PLC 400 commands that the z actuator 152 be moved to the up position. Then, at step 7, 507, PLC 400 commands that the y actuator 150 be moved in the y-direction to the out position such that the second actuator is above the drop tube 120. Next, at step 8, 508, PLC 400 awaits instruction to cut off the vacuum to screw pickup 142 to drop screw 121 into the drop tube 120.

At step 9, 509, PLC 400 receives a request from a manufacturing computer 550 (or another source such as manufacturing personnel pushing a button) that a screw is needed, PLC 400 by controlling air/vacuum generator 402 commands that the z actuator 152 be moved down to the drop position such that the screw 121 may be placed into the drop tube 120. Then, at step 10, 510, PLC 400 instructs air/vacuum generator 402 to stop vacuum flow to screw pickup 142 of the second actuator 150, 152 such that screw 121 drops into tube 120. At step 11, 511, screw 121 drops through tube 120 and passes magnetic sensor 123. Magnetic sensor 123 transmits screw passage data to PLC 400 and PLC 400 transmits data to manufacturing computer 550 that the screw 121 has been delivered for assembly.

Next, at step 12, 512, the y actuator 150 and z actuator 152 of the second actuator move in the y and z direction, respectively, back to the pickup position. At step 15, 515, PLC 400 determines that both screw pickup 142 and pocket 132 are empty. Because of this, at step 16, 516, PLC 400 commands that the first actuator 130 be moved back to the detection position in the x-direction and that vibrating rail 118 of the screw feeder start vibrating again until pocket 132 is again filled with a screw 121.

Process 500 then begins again. By utilizing the previously described mechanisms and processes the incidents of screw dropping problems, screw jamming problems, screw flipping problems, and other types of problems in the screw feeding process for manufacturing have been found to be significantly reduced. This has been found to be particularly useful for low aspect ratio screws in the disk drive manufacturing process. Also, embodiments of the previously described invention have been found to decrease interruption and down time in the manufacturing process.

These previous-described functions may be implemented by computer software/firmware/middleware etc. of PLC 400 and computer 550. However, it should be appreciated that a wide variety of electronic devices may be utilized to perform these functions such as various types of circuitry, processors, controllers, etc., with displays and/or sound devices.

For purposes of the present specification, it should be appreciated that the terms "processing logic unit (PLU)", "processor", "controller", "computer" etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Thus, components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

While embodiments of the invention and their various electrical, mechanical and functional components have been described in particular embodiments, it should be appreciated that the embodiments can be implemented with a wide variety of differing electrical, mechanical and functional components, and combinations thereof. Further, although one particular embodiment has been described as being employed for use in a disk drive manufacturing process, the embodiments of the invention may be implemented with numerous other types of manufacturing processes to manufacture a wide variety of different types of devices.

That which is claimed is:

1. A screw feeding apparatus to deliver a screw from a screw feeder having a vibrating rail to a screw guide tube, the screw feeding apparatus comprising:
    a first actuator including a pocket with a sensor, the first actuator moveable between a detection position and a retracted position, wherein the first actuator is configured to detect with the sensor a screw in the pocket received from the vibrating rail of the screw feeder in the detection position and to then, upon detection of the screw by the sensor, move to the retracted position; and
    a second actuator including a screw pickup with a screw detector, the second actuator moveable between a pickup position and a drop position, wherein the screw pickup of the second actuator is configured to detect and pick up the screw from the pocket of the first actuator in the pickup position and to move to the drop position to drop the screw into the screw guide tube, wherein the first actuator moves back to the detection position to detect with the sensor a next screw from the screw feeder and the second actuator moves back to the pickup position.

2. The screw feeding apparatus of claim 1, wherein the screw is dropped into the screw guide tube for use in assembling a disk drive.

3. The screw feeding apparatus of claim 1, wherein the first actuator is at least one of pneumatically controlled or motor controlled.

4. The screw feeding apparatus of claim 1, wherein the second actuator is at least one of pneumatically controlled or motor controlled.

5. The screw feeding apparatus of claim 1, wherein the sensor includes an optical sensor.

6. The screw feeding apparatus of claim 1, wherein screw detector includes a vacuum sensor.

7. The screw feeding apparatus of claim 1, further comprising a controller coupled to the sensor of the pocket of the first actuator and to the screw detector of the second actuator, wherein the controller:
    determines that the screw is located in the pocket based upon data from the sensor and commands that the first actuator be moved to the retracted position; and determines that the screw is located in the screw detector of the second actuator based upon data from the screw detector and commands that the second actuator be moved to the drop position to drop the screw into the screw guide tube.

8. The screw feeding apparatus of claim 7, wherein the screw guide tube further comprises a magnetic sensor that senses the passing of the screw and transmits screw passage data to the controller, wherein, the controller:
- determines that the screw has been dropped through the screw guide tube based upon the screw passage data from the magnetic sensor;
- commands that the second actuator be moved back to the pickup position; and commands that the first actuator be moved back to the detection position.

9. A method to deliver a screw from a screw feeder having a vibrating rail to a screw guide tube, the method comprising:
- moving a first actuator between a detection position and a retracted position, wherein the first actuator includes a pocket having a sensor, and the first actuator is configured to detect with the sensor a screw in the pocket received from the vibrating rail of the screw feeder in the detection position and to then, upon detection of the screw by the sensor, move to the retracted position; and
- moving a second actuator between a pickup position and a drop position, wherein a screw pickup with a screw detector of the second actuator is configured to detect and pick up the screw from the pocket of the first actuator in the pickup position and to move to the drop position to drop the screw into the screw guide tube, wherein the first actuator moves back to the detection position to detect with the sensor a next screw from the screw feeder and the second actuator moves back to the pickup position.

10. The method of claim 9, wherein the screw is dropped into the screw guide tube for use in assembling a disk drive.

11. The method of claim 9, wherein the first actuator is at least one of pneumatically controlled or motor controlled.

12. The method of claim 9, wherein the second actuator is at least one of pneumatically controlled or motor controlled.

13. The method of claim 9, wherein the sensor includes an optical sensor.

14. The method of claim 9, wherein screw detector includes a vacuum sensor.

15. The method of claim 9, further comprising a controller to implement functions including:
- determining that the screw is located in the pocket of the first actuator based upon data from the sensor;
- commanding that the first actuator be moved to the retracted position;
- determining that the screw is located in the screw detector of the second actuator based upon data from the screw detector; and
- commanding that the second actuator be moved to the drop position to drop the screw into the screw guide tube.

16. The method of claim 15, wherein the screw guide tube further comprises a magnetic sensor that senses the passing of the screw and generates screw passage data, wherein the controller further implements functions including:
- determining that the screw has been dropped through the screw guide tube based upon the screw passage data from the magnetic sensor;
- commanding that the second actuator be moved back to the pickup position; and commanding that the first actuator be moved back to the detection position.

* * * * *